United States Patent [19]
Kurosu et al.

[11] Patent Number: 5,471,549
[45] Date of Patent: Nov. 28, 1995

[54] METHOD OF DETECTING AND CORRECTING A DIRECTION OF IMAGE DATA AND DOCUMENT IMAGE FILING SYSTEM EMPLOYING THE SAME

[75] Inventors: Yasuo Kurosu, Yokosuka; Hidefumi Masuzaki, Hadano; Hiromichi Fujisawa, Tokorozawa, all of Japan

[73] Assignee: Hitachi, Ltd., Tokyo, Japan

[21] Appl. No.: 235,195

[22] Filed: Apr. 29, 1994

Related U.S. Application Data

[63] Continuation of Ser. No. 796,408, Nov. 22, 1991, abandoned.

[30] Foreign Application Priority Data

Nov. 28, 1990 [JP] Japan ................................. 2-322782

[51] Int. Cl.⁶ ................................................ G06K 9/32
[52] U.S. Cl. .................................... 382/290; 382/297
[58] Field of Search ........................... 382/46, 44, 10, 382/59, 61; 345/126, 124

[56] References Cited

U.S. PATENT DOCUMENTS

| | | | |
|---|---|---|---|
| 3,744,025 | 7/1973 | Bilgutay | 382/59 |
| 4,179,685 | 12/1979 | O'Maley | 382/46 |
| 4,516,264 | 7/1985 | Corvari et al. | 382/46 |
| 4,636,783 | 1/1987 | Omachi | 382/46 |
| 4,748,676 | 5/1988 | Miyagawa et al. | 382/46 |
| 5,020,117 | 5/1991 | Ooi et al. | 382/46 |
| 5,034,733 | 7/1991 | Okazawa | 382/46 |
| 5,060,276 | 10/1991 | Morris et al. | 382/46 |
| 5,077,811 | 12/1991 | Onda | 382/46 |
| 5,235,651 | 8/1993 | Nafarieh | 382/46 |

FOREIGN PATENT DOCUMENTS 2-79184  3/1990  Japan.

OTHER PUBLICATIONS

H. Fujisawa, et al., "Development of A Kanji OCR", Proceedings on Pattern Recognition, Nov. 7–10, 1987, pp. 816–820.

Primary Examiner—Joseph Mancuso
Attorney, Agent, or Firm—Fay, Sharpe, Beall, Fagan, Minnich & McKee

[57] ABSTRACT

A document is scanned by an optical scanner to be converted into digital image data to be transmitted to an image memory. Characters are extracted from the digital image data one by one and features are extracted from each of the extracted characters. The features as standard patterns stored in a character recognition dictionary are read out to be subjected to 90 degree rotation, 180 degree rotation and 270 degree rotation by a feature rotator, thereby to produce standard patterns of the four directions. Similarity measures are individually calculated between the standard patterns of the four directions and the features of each extracted character, with respect to the four directions. This processing is repeated for a plurality of characters recorded in the document to select a direction having the maximum add value of the similarity measures, thereby to detect an input direction of the document. When the detected direction is not a proper direction, the counterclockwise rotation is given to the digital image data to correct the digital image data to the proper direction.

14 Claims, 7 Drawing Sheets

CHARACTER RECOGNITION DICTIONARY
FEATURES OF ONE CHARACTER

CAPACITY OF THE CHARACTER RECOGNITION DICTIONARY

CAPACITY OF THE INPUT IMAGE

METHOD OF DETECTING AND CORRECTING A DIRECTION OF IMAGE DATA AND DOCUMENT IMAGE FILING SYSTEM EMPLOYING THE SAME

This is continuation of U.S. application Ser. No. 07/796,408, filed Nov. 22, 1991, now abandoned.

BACKGROUND OF THE INVENTION

The present invention relates to a method of detecting and correcting a direction of image data and more particularly to a method of detecting and correcting a direction of a document image and a system employing the same which are suitable for being applied to an image filing system with an automatic document feeder.

In recent years, an image filing system is out in the market as the fourth office automation system following a word processor, a personal computer and a facsimile, and is attracting much attention as means for pursuing the paperless promotion in a class of an office or design. The image filing system is designed in such a way as to accumulate a large quantity of image information by utilizing an optical disc and to read out the image information therefrom promptly according to need to print them. Therefore, the image filing system is caused to be remarkably used by the class generating a large quantity of documents. As a result, it becomes one of important problems in the image filing system to promote the labor-saving of the work of inputting documents and drawings generated in large quantities every day.

With respect to the work of inputting an image, the prior art image filing system is provided with an automatic document feeder for automatically feeding an input document to promote automation of the input work. As for the image filing system with an automatic document feeder, there is known an optical disc Filing System, e.g., Hitachi 650EX manufactured by Hitachi, Ltd.

However, in such systems, since the direction of scanning an image is made to be uniform by a direction from the top to the bottom, there is needed a great deal of work in the processes before and after the automatic document feeding. That is, in the process prior to the automation document feeding, an operator needs to carefully arrange the document in one direction. Moreover, in the process posterior thereto, the inputted images need to be displayed one by one to confirm the direction of the document.

Hitherto, as a system for solving the above-mentioned disadvantages, there is given JP-A-2-79184 which was filed with the Patent Office of Japan by the present patent applicant and was laid open to public inspection on Mar. 19, 1990.

In this prior art, the discrimination of the input direction is achieved in such a way that a predetermined amount of rotation is given to the input image itself and characters included in the image having the rotation thus given thereto are recognized. Moreover, in this prior art, if the correction is given to the proper direction, it is possible to achieve automatic correction of the input image.

More specifically, image data outputted from image input means or storage means are rotated in the forward or reverse direction every predetermined angle, and the processing of recognizing the image data which has been subjected to the rotation processing is performed every rotation to judge the image data having a high recognition rate to be in a direction of a normal image.

As described above, the system employing that prior art is designed in such a way that the rotation is given to the input or output image data themselves, and the characters included in the image data thus rotated are recognized to obtain the direction of the input or output image. Therefore, the arrangement of the direction of the document and the visual inspection of the input image which must be performed even using the scanner with an automatic document feeder become needless. As a result, it is possible to improve the registration speed of the image data.

As described above, according the above-mentioned prior art, the arrangement of the direction of the input document and the visual inspection for confirmation of the image become needless. As a result, the problem relating to the labor-saving in the input work is largely improved.

However, in the above-mentioned prior art, since the rotation is given to the input image itself, there still remains a problem in which the time required for the detection processing is increased.

More specifically, a document of a standard A4 size has a quantity of data of 500 KB or so, and therefore, even if such a document is processed using an exclusive image processor, a time from a several seconds to several tens of seconds is required. Accordingly, although the above-mentioned prior art attains the object of automation free from labor, there is provided a disadvantage in which work efficiency is reduced as compared with the case requiring the labor. Incidentally, "A4" is one size of a business recording sheet which is standardized by the Japanese Industry Standard. Moreover, in the above-mentioned prior art, it is suggested that a character recognition dictionary used for recognizing an inversion character or the like is used. However, the capacity of the character recognition dictionary is obliged to be unnecessarily large.

Incidentally, as for the related application in the image filing system by the present patent applicant, there are known "Method And Apparatus For Rotating Dot's Data" by K. Okazawa et al., U.S. patent application Ser. No. 271,275 issued as U.S. Pat. No. 5,034,733. In these articles, there is disclosed a technique of rotating image data.

SUMMARY OF THE INVENTION

It is therefore an object of the present invention to provide a method of detecting and correcting a direction of inclination of an image corresponding to inputted or outputted image data at a high speed, and a system employing the same which are used with an image filing system for accumulating a large quantity of image information.

It is another object of the present invention to provide a method of detecting and correcting a direction of an image inputted from a free direction at a high speed, and a system employing the same which are used with an image information input system for receiving a large amount of images.

It is still another object of the present invention to provide an image filing system for accumulating document image data wherein when input document image data are accumulated in filing means, a direction of inclination of input document image data can be detected and corrected with a simple system arrangement at a high speed.

It is yet another object of the present invention to provide an image filing system for accumulating document image data wherein input document image data are accumulated in filing means, a direction of inclination of input document image data can be detected and corrected at a high speed without increasing a capacity of a character recognition dictionary.

In order to attain the above objects, a method of detecting a direction of an image, by paying attention to a feature in a character recognition dictionary used with character recognition, rotation is given to the feature every predetermined angle, and the feature having the respective directions thus given thereto and an inputted or read out character included in the image are matched with one another. As a result, a direction having the highest matching value is detected.

In general, the features within the character recognition dictionary used with the character recognition is obtained by extracting only a structural feature from character image data. Therefore, the data quantity of feature is in the range of from one several tenths to a hundredth or so as compared with a quantity of graphic character image data. Thus, a capacity thereof is small. Therefore, by giving rotation to the features in the character recognition dictionary, the processing time required for detecting a direction can be reduced, and the detection of a direction of a document image or the like and the correction thereof can be carried out at a high speed.

During the rotation of the feature read out from the recognition dictionary, preferably, the rotation of 90, 180 and 270 degree (−90 degree) is given to the feature and the features having the respective directions thus given thereto are stored in predetermined areas in a memory. With the recognition dictionaries having a number of directions, the features stored therein and those of a plurality of input characters are matched with one another to determine the direction having the highest matching value.

In the present invention, it is preferable that the character recognition dictionary is made up of kinds of characters, each of which is generally an asymmetry between the upper and lower halves and between the right and left halves and has a high frequency of appearance, such as numerals, alphabet and Japanese syllabary.

In the present invention, the correction processing is performed in such a way that the rotation of 90, 180 or 270 degree is given to the digital image of the input character in the reverse direction. Incidentally, instead of the correction, the input document may be reset in the proper direction. As a method of indicating the reset, there is used a method such as generation of a warning sound, lighting of a warning lamp, or display of a warning message on a scope of a display for an operator.

In the present invention, the special attention is paid to that the direction of the document image depends on the characters recorded in the document, and that the data quantity of the features of the recognition dictionary is smaller than that of the features of the input image. Thus, these points are effectively utilized.

More specifically, the document image shows various forms such as a shape of a recording sheet and a row of characters. With respect to the former, there are a sheet of paper larger than its width and a long sideways sheet. With respect to the latter, there are a vertical writing and a horizontal writing. Normally, with respect to the form of a sheet, there is considered four kinds of combinations not counting the size of a sheet. That is, with respect to the sheet of paper longer than its width, there are two kinds of combinations, i.e., a vertical writing and a horizontal writing. With respect to the long sideways sheet, likewise, there are two kinds of combinations, i.e., the vertical writing and the horizontal writing. However, if attention is paid to the contents recorded in the document, the direction of the document can be uniquely determined irrespective of these variations. With a document image, the right direction of the character always shows the proper direction. Therefore, the direction of the character recorded in the document is judged while giving the rotation to the features of the character recognition dictionary. If the judgement result does not correspond to the right direction, the correction is given to the document image data so as to obtain the right direction. As a result, even if the image is set in an arbitrary direction, it can be inputted from the proper direction.

DESCRIPTION OF THE PREFERRED EMBODIMENTS

Figure 2:
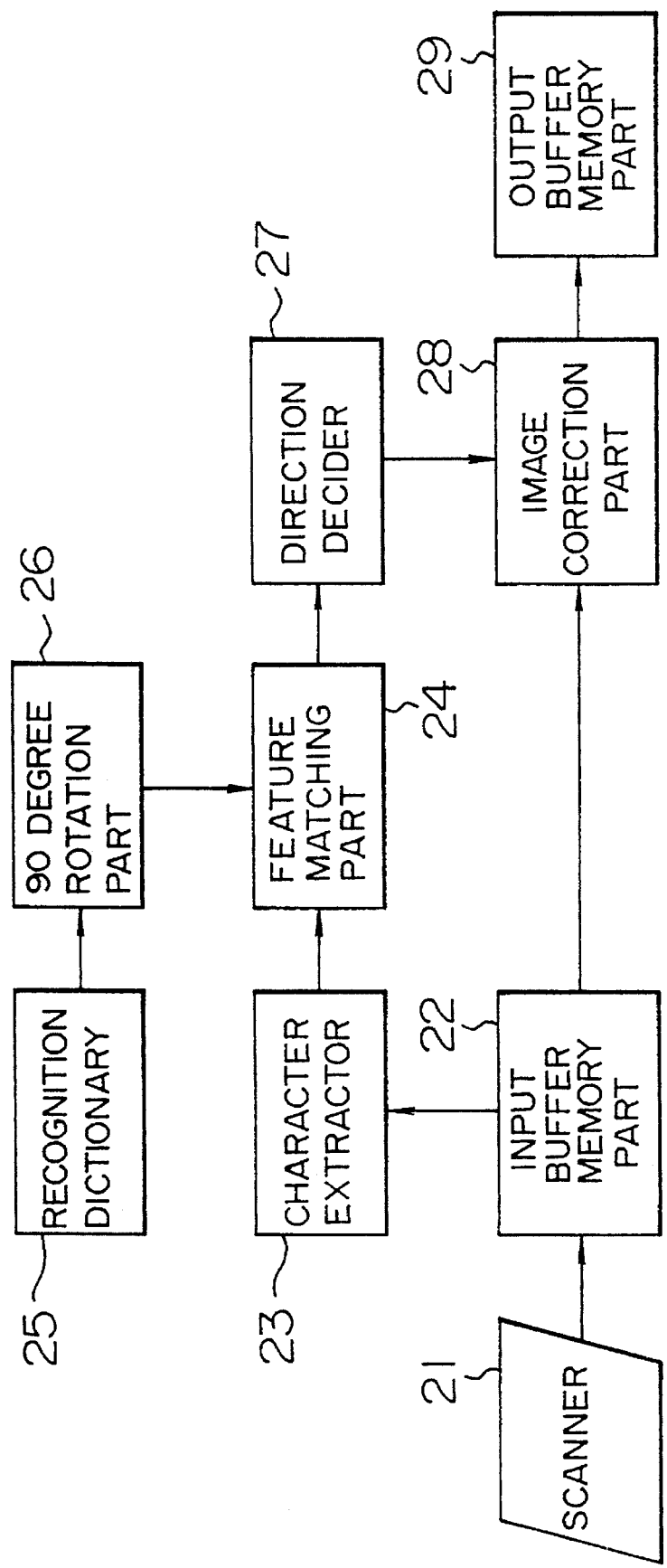
FIG. 2 is a functional block diagram showing the principle and functions of the present invention.

First, the principle of the present invention will be described. An image information input system of the present invention executes two processing, i.e., the detection and the correction of a direction of an input image. FIG. 2 is a functional block diagram showing the principle and arrangement of the present invention.

First, the detection processing is executed in two steps for an input image. During the detection, the following processing is carried out as a preprocessing.

A document inputted to a scanner 21 is optically scanned and then is converted into digital image data of a binary level to be inputted to an input buffer memory part 22.

The digital image data inputted to the input buffer memory part 22 is temporarily stored in the part 22 and then are outputted for the detection and correction.

In the first stage of the detection, the characters included in the document image data are recognized from four directions one by one. That is, in a character extractor 23, the characters are extracted from the document image data one by one to be fed to a feature matching part 24. On the other hand, each of the features as a character recognition dictionary stored in a recognition dictionary 25 is fed to 90 degree rotation part 26. Then, dictionaries relating to four directions of 0, 90, 180 and 270 degrees are produced. The dictionaries thus produced are fed to the feature matching part 24 in the same manner as in the extracted characters. Then, the four similarity measures are calculated between the input character image data and the features of the recognition dictionaries relating to the four directions, for every character. In such a manner, the calculation of the similarity features relating to every included character is completed.

In the second stage of the detection, the direction of the input image is determined on the basis of statistical data of a plurality of inputted characters. That is, with a plurality of characters, the similarity measures which are calculated in the feature matching part 24 and correspond to the plurality of characters are added to one another in a direction decider 27, with respect to each direction. In this connection, the direction indicating the largest similarity measure is selected or decided as the direction of the input image. Although the addition is employed in the present embodiment, an average may be calculated. Thus, the direction of the input image is determined.

Incidentally, the character recognition technique is not referred in the above description. However, in the case of the recognition technique relating to numerals, alphabet or Chinese characters, there may be provided the above-mentioned effect.

Next, the correction is executed in two kinds of processings depending on an angle to be corrected. In other words, the processing of 0 degree and that of another degree are executed. With the former, since the document is judged to be inputted in the proper direction, the correction processing is not executed. Then, the document data are directly outputted from an image correction part 28 to an output buffer memory part 29. With the latter, the correction is executed so as to make the detection result coincide with 0 degree. In the case where the detection result coincides with 90 degree for example, the rotation is given counterclockwise to the input image data in the image correction part 28 to output the resultant data to the output buffer memory part 29.

Thus, according to the present invention, the direction of the arrangement of the characters directly relating to the direction of the document is detected while giving the rotation to the features of the recognition dictionary, and the necessary correction is executed in accordance with the detection result. Therefore, it is possible to provide a system capable of detecting and correcting a direction of an image at a high speed as compared with the prior art system.

The preferred embodiments of the present invention will hereinafter be described in detail with reference to the accompanying drawings.

Figure 1:
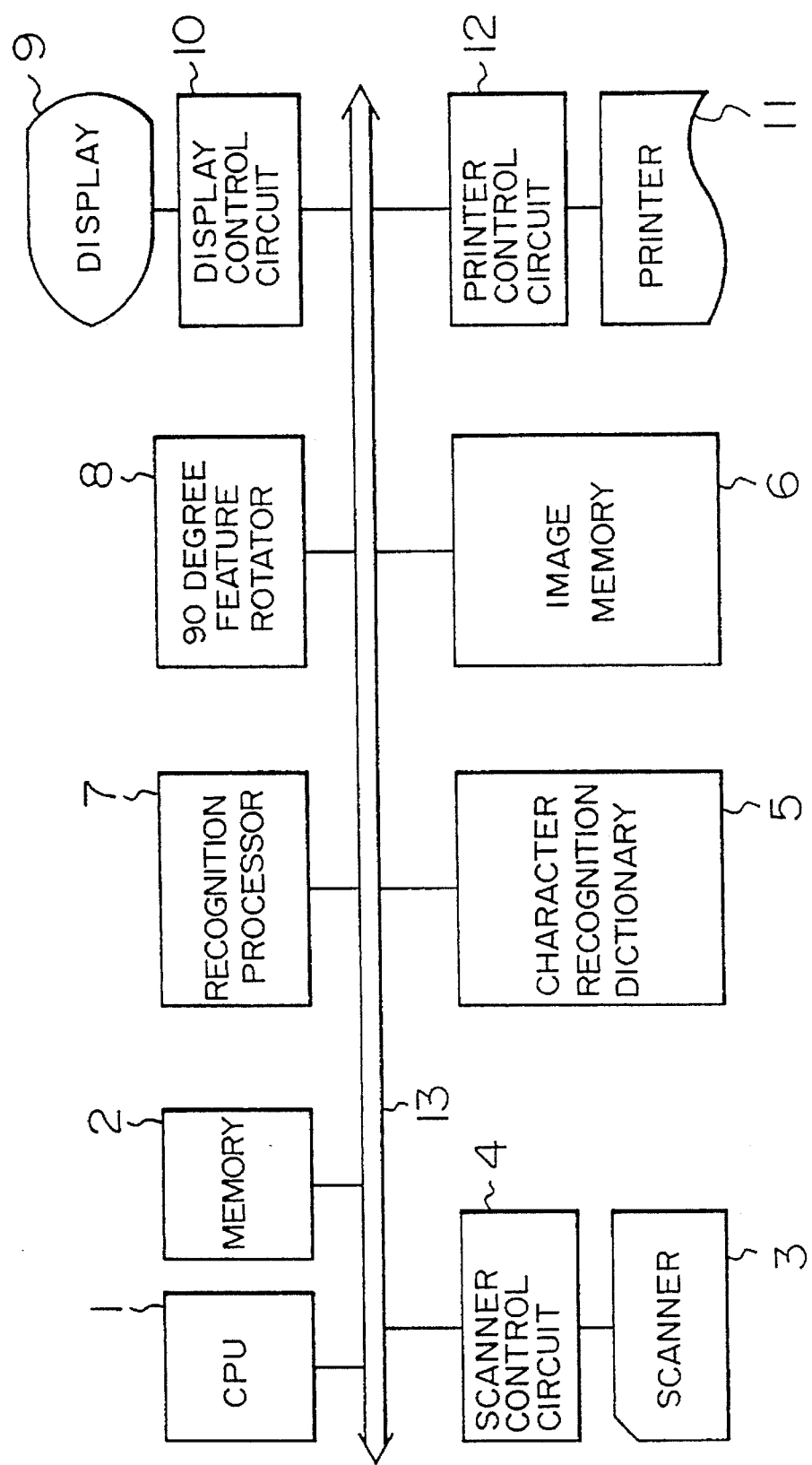
FIG. 1 is a schematic block diagram showing the arrangement of the first embodiment of the present invention.

FIG. 1 is a block diagram showing the hardware arrangement of an image filing system according to the first embodiment of the present invention.

In the figure, the reference numeral 1 designates a central processing unit (hereinafter, referred to as "CPU", when applicable) constructed by "i80386" manufactured by Intel Co., Ltd., for example,; the reference numeral 2 designates a memory utilized by the CPU 1; the reference numeral 3 designates a scanner for converting an optical input image into a digital image; the reference numeral 4 designates a scanner control circuit for controlling the scanner 3; the reference numeral 5, a character recognition dictionary for storing features as standard patterns used for recognizing characters; the reference numeral 6, an image memory for temporarily storing data of an input image; and the reference numeral 7, a recognition processor as an exclusive hardware for recognizing a character.

Moreover, the reference numeral 8 designates a feature rotator for subjecting the features or the like stored in the character recognition dictionary 5 into 90 degree conversion with 90, 180 and 270 degrees and the like; the reference numeral 9 designates a display for displaying an image; the reference numeral 10 designates a display control circuit for controlling the display 9; the reference numeral 11, a printer for printing an image to output it; the reference numeral 12, a printer control circuit for controlling the printer 11; and 13, a bus for transmitting therethrough the data. Incidentally, in addition thereto, the image filing system includes a large capacity-filing apparatus (not shown) such as an optical disc apparatus connected to the bus 13. Moreover, the feature rotator 8 may employ a digital signal processor (DSP). For example, if an image processing processor such as "T9506" manufactured by Toshiba Co., Ltd. is employed, it is possible to rotate an image of a multi-level.

In this hardware arrangement, the document inputted into the scanner 3 is optically scanned and then is converted into a digital image data of a binary level to be transmitted to the image memory 6 through the scanner control circuit 2 and the bus 13. With the digital image data inputted to the image memory 6, a character is extracted therefrom one by one. As a result, the features similar in kind to those stored in the character recognition dictionary 5 are extracted.

Since the direction of the input image is determined on the basis of the character recognition dictionary while performing the above operation, each feature as a standard pattern of a kind of character is read out to be transmitted to the feature rotator 8. The standard pattern inputted to the feature rotator 8 is subjected to 90 degree rotation, 180 degree rotation and 270 degree rotation in sequence. As a result, including the feature as a standard pattern of 0 degree, the standard patterns relating to the four directions are produced to be transmitted to the recognition processor 7. The similarity measures are calculated between the standard patterns of the four directions inputted to the recognition processor 7 and the digital image of which features are already extracted. As the pattern recognition technique utilizing the features of the image, there is employed the well-known technique. The details of that technique are described in an article "Development of A Kanji OCR" by H. Fujisawa et al., Proceedings of the Fourth International Joint Conference on Pattern Recognition, Nov. 7–10, 1978, pp. 816–820.

Now, the above-mentioned series of operations are repeatedly executed for a plurality of characters recorded in the input document image. As a result, with respect to each character, an add value of the similarity measures is calculated every direction. Subsequently, on the basis of the add values thus calculated, the direction of the input document image is determined. That is, out of the four directions, the direction having the maximum add value is selected, and the judgement result is outputted to the CPU 1.

In response to the judgement result, the CPU 1 issues an instruction used for correcting the input document image to the proper direction, in accordance with the processing program stored in the memory 2. That is, in the case where the judgement result corresponds to the rotation of 0 degree, the digital image data stored in the image memory 6 are directly regarded as data after the correction to be displayed on the display 9 through the display control circuit 10. Moreover, as required, that digital image data is printed and outputted through the printer control circuit 12 by the printer 11.

On the other hand, in the case of each judgement other than the judgement corresponding to the rotation of 0 degree, the digital image stored in the image memory 6 are judged to be inputted from the incorrect direction to be transmitted to the feature rotator 8. The digital image data inputted to the feature rotator 8 are corrected in such a way that the direction after the correction coincides with 0 degree. That is, in the case where the above judgement result corresponds to the rotations of 90 degrees, the rotation of 90 degrees is given counterclockwise to the digital image data, and in the case where the above judgement result corresponds to the rotation of 270 degrees (−90 degrees), the rotation of 90 degrees is given clockwise to the digital image data.

The digital image data which were corrected by the above operation are again returned to the image memory 6 and then are outputted to the display 9 or the printer 11 as required. In the above-mentioned embodiment, the correction is automatically given to the digital image data, which were inputted from the incorrect direction, by the feature rotator 8. However, the system may be arranged in such a way that during the input of the document image from the incorrect direction, some warning is generated and the correction is given to the image data by a manual operation.

Figure 3:
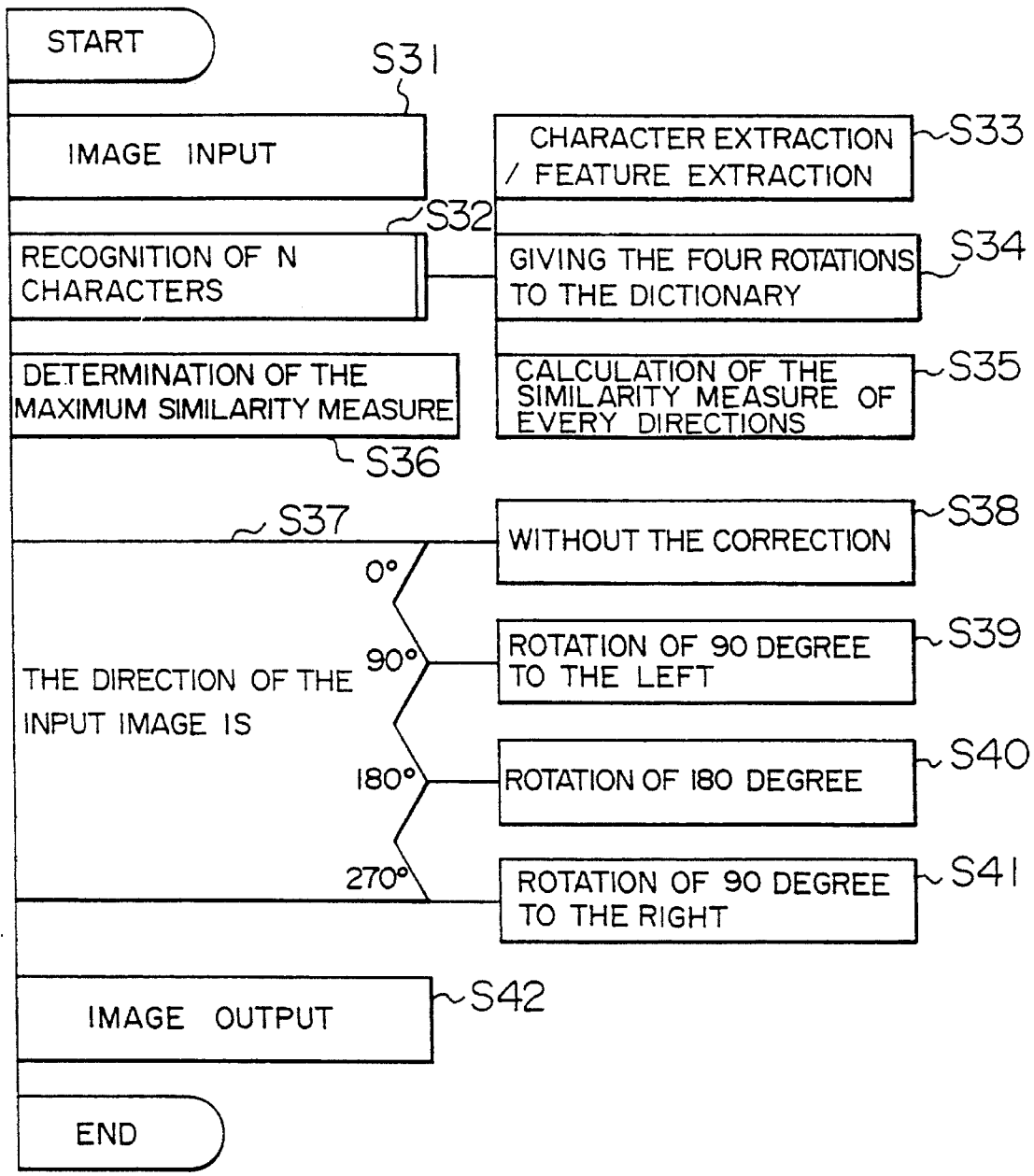
FIG. 3 is a flow chart showing the processing flow of the detection and correction of a direction of an input document image in the first embodiment of the present invention.

In FIG. 3, there is shown a flow chart (Problem Analysis Diagram; hereinafter, referred to as simply "PAD", when applicable) of a method of detecting and correcting a direction of an image in the present embodiment.

Referring to the figure, first, an image is inputted (S 31). In the present embodiment, in this image input step, the document image is scanned by the scanner with an automatic document feeder. However, the image input may also be performed by the reception of the image data by a facsimile or the like, or by reading out the image data which are already accumulated in the external memory or the like.

Subsequently, the direction of the input image is detected by recognizing N characters (N is a positive integral number) (S 32). First, the characters are extracted from the image data thus inputted one by one to extract the same features as those of the character recognition dictionary (S 33). Then, the character recognition dictionary is read out and the rotation is given to the character recognition dictionary every 90 degrees. As a result, the dictionaries relating in all to the four directions are prepared (S 34). These dictionaries are, for example, temporarily stored in predetermined areas of the memory 6. Finally, the similarity measures are individually calculated between the dictionary data which were produced with respect to the four directions and a character pattern as the measure of the input character, with respect to the four directions (S 35).

The above series of operations are repeated with regard to N characters to determine the maximum similarity measure, i.e., the direction of the input document image (S 36). Further, on the basis of the direction thus determined, the input image data are corrected (S 37). First, in the case where the above judgement result corresponds to the rotation of 0 degree, since the input image is inputted properly, no correction is given to the input image (S 38). In the case of the rotation of 90 degree, the rotation of 90 degree is given counterclockwise to the input image to correct the input image to the proper direction (S 39). In the case of the rotation of 180 degree, since the input image points in an upside-down direction, the rotation of 180 degree is given to the input image to perform the correction (S 40). In the case of 270 degrees, the rotation of 90 degrees is given clockwise to the input image to perform the correction (S 41). Finally, input image data which were subjected to the correction or no correction are outputted (S 42) to complete the total processes.

As apparent from the above description, according to the present invention, the direction of the input document image can be detected while the necessary rotation is given to the character recognition dictionary using the feature rotator to perform the correction on the basis of the detection result. Therefore, the input work can be carried out at a high speed without properly arranging the direction of the input image.

The second embodiment of the present invention will hereinafter be described on referring to FIG. 4.

Figure 4:
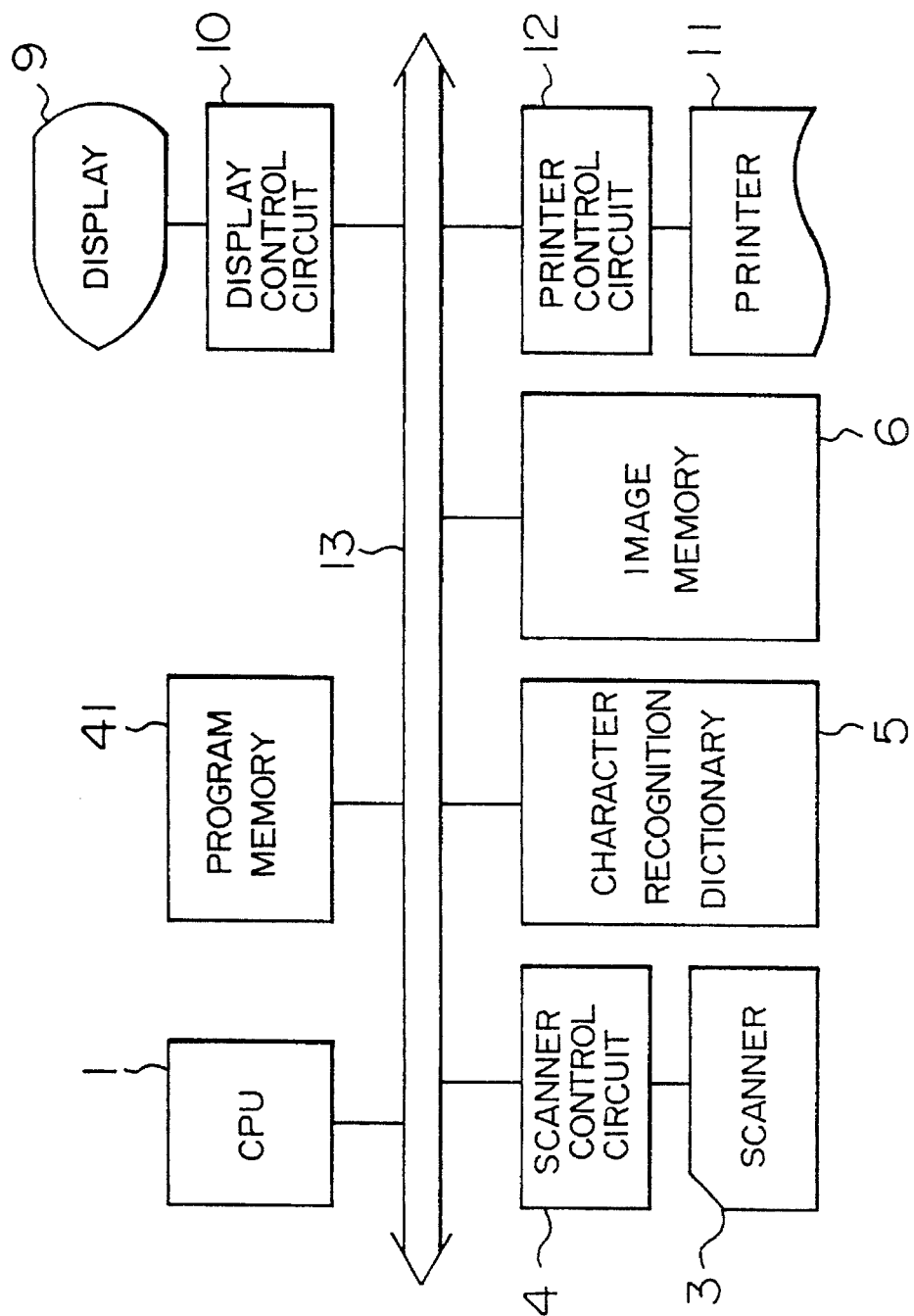
FIG. 4 is a schematic block diagram showing the arrangement of the second embodiment of the present invention.

FIG. 4 is a block diagram showing the hardware arrangement of an image filing system as an example of a system to which the present invention is applied.

The difference of the hardware arrangement of the present embodiment from that of the embodiment of FIG. 1 is that the recognition processor 7 and the feature rotator 8 are not provided, and instead of the memory 2, a program memory 41 is provided. In the program memory 41 are stored a program and data for controlling the whole image filing system by the CPU 1, a program for 90 degree rotation processing on the basis of which instead of the feature rotator 8 of FIG. 1, the CPU 1 is operated, and a program for character recognition processing on the basis of which instead of the recognition processor 7, the CPU 1 is operated.

Incidentally, in the hardware arrangement shown in FIG. 4, the processing of the CPU 1 is utilized instead of the both processings of the feature rotator 8 and the recognition processor 7. However, such an arrangement may be designed that the processing of the CPU 1 is utilized instead of the processing of one of the feature rotator 8 and the recognition processor 7. Moreover, such an arrangement may be designed that CPUs other than the CPU 1 are substituted for the feature rotator 8 and the recognition processor 7, respectively.

Figure 5:
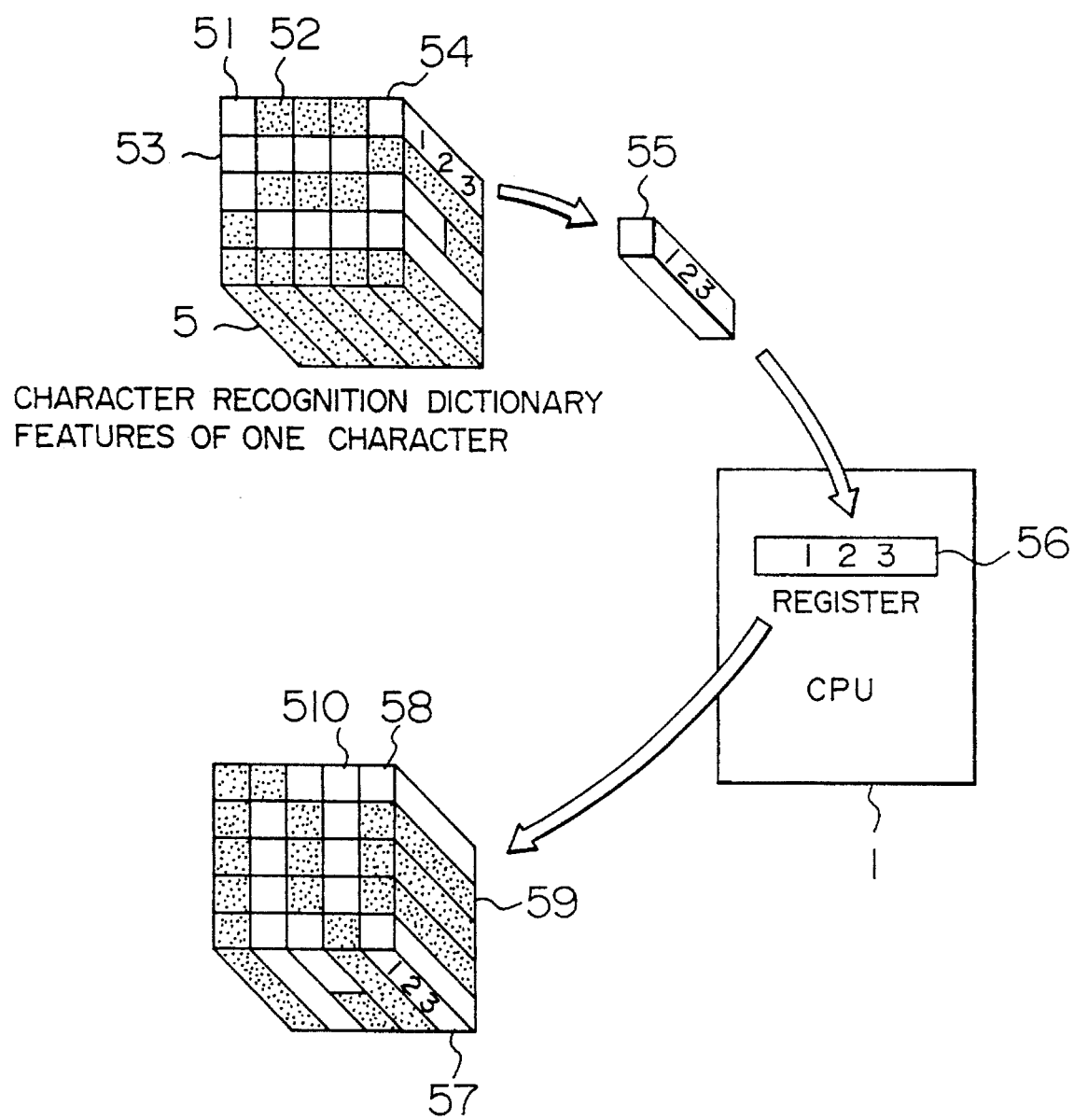
FIG. 5 is a schematic view useful in explaining a method of rotating features included in a character recognition dictionary in the second embodiment of the present invention.
Figure 6:
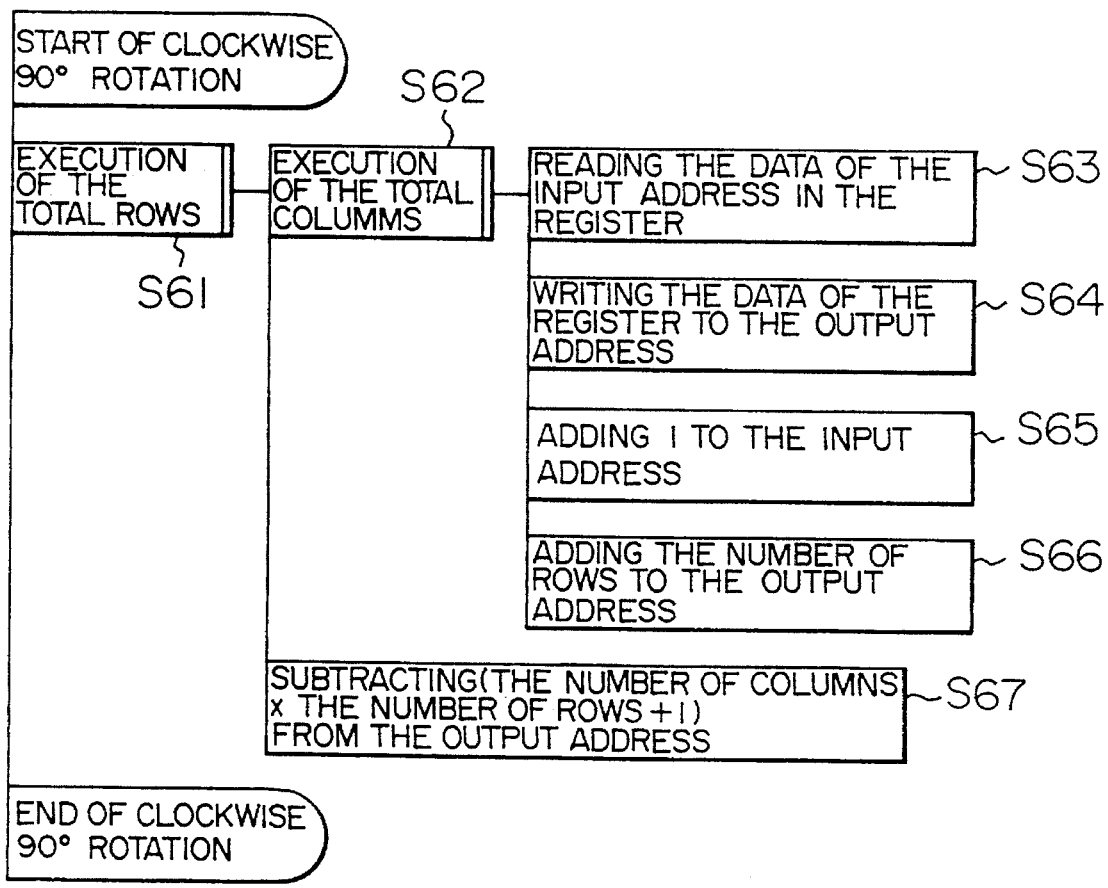
FIG. 6 is a flow chart useful in explaining a 90 degree rotation processing in the second embodiment of the present invention.

FIG. 5 is a conceptual view useful in explaining the processing of rotating clockwise the features stored in the character recognition dictionary 5 by 90 degrees by the CPU 1. FIG. 6 is a PAD showing the program for 90 degree rotation processing by the CPU 1, for carrying out the processing shown in FIG. 5. In the present embodiment, the clockwise 90 degree rotation is shown as an example. However, in the cases of the 180 degree rotation and the counterclockwise 90 degree rotation, the similar processing is performed.

As shown in FIG. 5, the feature as the standard pattern stored in the character recognition dictionary 5 is represented by data of plural bits, i.e., a multi-level with respect to one coordinate. As the contents of the feature, there is typically known density values which are obtained by applying the mask processing of the two-dimensional Gaussian distribution to the individual coordinates. In the example of FIG. 5, for brevity, the features of one character are represented in the form of 5 rows×5 columns. Moreover, one feature is 8 bits. The features of one character are constructed in such a way that in the memory storing the character recognition dictionary 5, a feature 52 is stored in an address which is obtained by adding 1 to an address of a feature 51 and a feature 53 is stored in an address which is obtained by adding 5 to the address of the feature 51.

The processing of the CPU 1 will subsequently be described with reference to FIG. 5 and in accordance with the PAD of FIG. 6. First, the CPU 1 reads out the feature 51 from the character recognition dictionary 5 in a manner as shown by a feature 55 to write it to a register 56 within the CPU 1 (S 63). The value of the feature 51 written to the register 56 is then written to a coordinate 58 (S 64). 1 is added to an input address so that after the feature 51, a subsequent feature 52 can be written (S 65). Further, the number of rows, i.e., 5 in the present embodiment is added to an output address, so that the writing to a coordinate 59 next to the coordinate 58 can be performed (S 66). The features from the feature 51 to the feature 54 are written from the coordinate 58 to the coordinate 57, while keeping the respective values as they are, by a loop (S 62). After completing the transmission of the features of one row, (the number of columns×the number of rows+1), i.e., 26 in the present embodiment is subtracted from the output address, so that the writing to a coordinate 510 after the coordinate 57 can be performed (S 67). Then, after transmitting all the rows, the features which were clockwise rotated by 90 degree are obtained (S 61). Exemplifying one feature, the value "123" of the feature 54 is read out as the feature 55 and that feature is also stored in the register 56 in the form of the value "123" to be written to the coordinate 57 in the form of the value "123".

Moreover, in the above embodiment, the features of one character are represented by the two dimensions. However, with respect to the features of one dimension as well which are obtained by projecting black picture element distribution of a character pattern on the X-coordinate or the Y-coordinate, the 90 degree rotation can be performed so as to transmit one row from the feature 51 to the feature 54 from the coordinate 58 to the coordinate 57.

As for the procedure of the character recognition processing, in the case where the features are represented by the density, such a technique may be designed that with the character extracted from the input image, the density values as the features are calculated, and the density elements overlapping with each other over the whole coordinates of one character are obtained by integrating the overlapping areas, thereby to calculate the similarity measure. Thus, with respect to the whole face of the input image, the similarity measures of the four directions are calculated. Then, it is judged that the direction having the maximum similarity measure is the direction of the input image.

Further, in the above embodiment, the similarity measures are calculated with respect to the whole face of the input image. However, for the purpose of achieving a high speed operation, such a technique may be designed that the recognition object of the recording sheet is limited to the upper half for example. Furthermore, for the purpose of realizing a high speed operation, even if kinds of characters to be recognized are limited to ten characters of numerals or alphabet, the effects of the present invention can be kept up.

The feature and the character recognition processing are described in the above-mentioned article "Development of A Kanji OCR: An Optical Chinese Character Reader" by H. Fujisawa et al., Proceeding of the Fourth International Joint Conference on Pattern Recognition, Nov. 7–10, 1978, Kyoto, Japan, pp. 816–820.

When the hardware arrangement shown in FIG. 4 is put into practical use, in the same manner as in the first embodiment, for example, the "i80386" manufactured by Intel Co., Ltd. can be used as the CPU 1. Further, the feature rotator for rotating the feature by 90 degrees can also be constructed by a Direct Memory Access Controller (DMAC), e.g., "HD68450" manufactured by Hitachi Ltd., in addition to the processor.

Figure 7A:
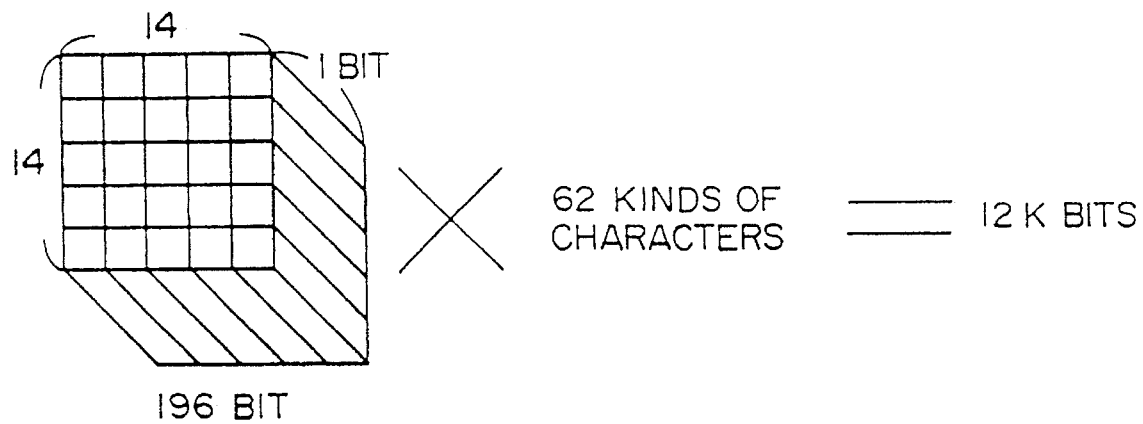
FIGS. 7A and 7B are schematic views useful in quantitatively explaining the effects of the present invention.
Figure 7B:
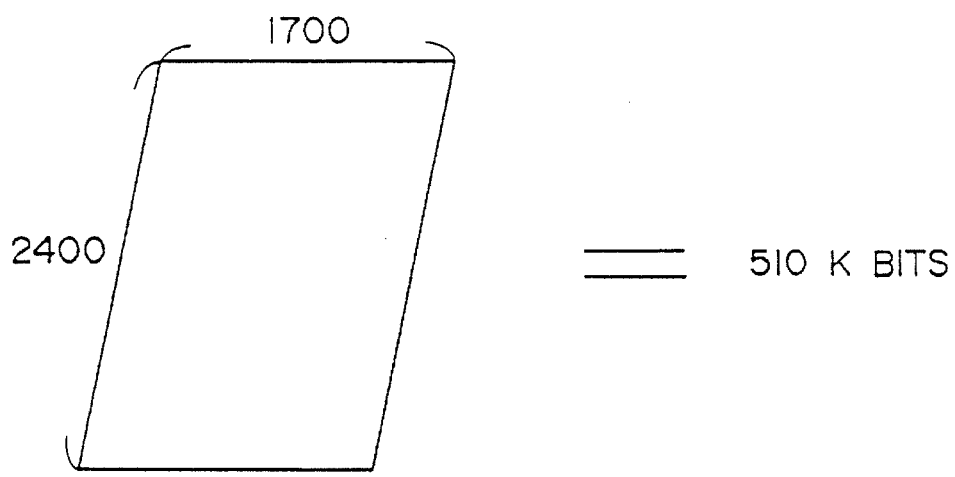

Finally, FIGS. 7A and 7B are conceptual views showing the comparison between the character recognition dictionary 5 and the data quantity of the input image, for explaining the effects of the present invention. FIG. 7A is a schematic view showing the character recognition dictionary 5. If one character is divided into the coordinates of 14 rows×14 columns and 1 bit is assigned to each of the coordinates, the data quantity of about 196 bits per character is obtained for the features of one character. If the features of 62 characters made up of alphabet and numerals are stored in the character recognition dictionary 5, the capacity thereof is at most about 12 Kbits. Therefore, the character recognition dictionary 5 can be readily constructed by a 1Mbit-memory, e.g., "HM511000" manufactured by Hitachi, Ltd. which is widely used nowadays.

On the other hand, the capacity of 48 Kbits about 4 times as large as the above case is required for storing the features which were obtained by 90 degree rotation, 180 degree rotation and 270 degree rotation. Therefore, if the 1Mbit-memory is used, the address control is required and thus the arrangement becomes complicated. Moreover, the capacity of the memory 4 times as large as the above case is required for storing the character recognition dictionary 5 and this results in increasing of the cost of the system.

Moreover, as for the method of detecting the direction of the input image, such a method may also be designed that the rotation is given to the input image itself and the rotated input image is recognized to be judged. However, in this case, there is provided a disadvantage in which the data quantity of the input image becomes large so that the large quantity of input image cannot be processed within an actual processing time. Then, FIG. 7B is a schematic view showing the data quantity of input image. Although the data quantity of input image depends on the size of the recording sheet and the resolution, in this case, 200 DPI (Dot Per Inch) is supposed with the standard recording sheet of A4 size. In this case, the input image has the size 2400 by 1700 dots. Since 1 bit is required for 1 dot, the data quantity becomes about 510 Kbits. Thus, the data quantity of input image is 42.5 times as large as that of the character recognition dictionary 5 and in proportion to the data quantity, the processing quantity required for 90 degree rotation, 180 degree rotation and 270 degree rotation is increased. Therefore, in the case where the rotation is given to the character recognition dictionary 5 itself instead of the input image, the data can be processed in the period of time of 1/40 or less, as compared with the case of rotation of the input image.

As apparent from the above description, since each of the features stored in the character recognition dictionary 5 is represented by the multi-level and are stored in the memory of the character recognition dictionary 5 in the form of 8 bits, i.e., integral multiple of 1 bite. Therefore, the feature in each of the coordinates can be readily rotated by 90 degree by only the address control and the direction of the input image can be detected at a very high speed. Further, the data quantity of the character recognition dictionary 5 is 1/40 or less of that of the input image, and therefore, as compared with the case where the input image is directly rotated, the direction of the input image can be detected at a higher speed.

As set forth hereinabove in detail, according to the present invention, by paying attention to that the character recognition dictionary has the data quantity less than that of the input image, the rotation is given to the recognition dictionary itself to determine the direction of the input image and then the input image is corrected. Therefore, as compared with the prior art method of rotating an input image, the judgement and the correction can be performed at a higher speed.

In the method of giving the rotation to the input image, since the rotation is given to an enormous amount of image data, there is a limit in that the speed of detecting the direction is reduced. As opposite thereto, in the present invention, there is no need for rotating the input image. As a result, the document can be set by only being inserted into the automatic document feeder without being aware of the input direction thereof. Therefore, it is possible to largely improve the convenience of treating the document. Especially, in the class requiring an enormous amount of input data, that effect is very great in term of the practical use.

What is claimed is:

1. A method of detecting a direction of image data inputted by scanning a document by a scanner, used in a document image filing system including at least a central processing unit, a character recognition dictionary and said scanner, said method comprising the steps of:

extracting data of one character from the input image data;

extracting a feature from the extracted data of the one character;

storing standard patterns in said character recognition dictionary;

reading one of the standard patterns corresponding to the extracted feature;

rotating the read standard pattern, corresponding to the extracted feature, stored in said character recognition dictionary to produce a plurality of features, corresponding to the extracted feature, in different directions from one another;

calculating degrees of similarity between the feature of the data of one character and the plurality of features in different direction from one another;

detecting a direction of the input image data on the basis of the degrees of similarity; and correcting the direction of the image data by rotating an angle of the input image data so as to correct the input image data to a proper direction.

2. A method of detecting a direction of image data according to claim 1, wherein the feature as the standard pattern is rotated in amounts of are 90, 180 and 270 degrees.

3. A method of detecting a direction of image data according to claim 2, further comprising the step of:

correcting the direction of an angle of the image data by rotating the input image data by 90, 180, or 270 degrees on the basis of said direction detection step so as to correct the input image data to a proper input direction 4. A method of detecting a direction of image data according to claim 1, wherein the degrees of similarity in said direction detection step are accumulated values obtained using the data of a plurality of characters in the document.

5. A document image filing system having means for generating digital image data by optically scanning a document, a CPU, an image memory and a filing unit connected to one another through a bus, the system comprising:

means for extracting data of one character from the digital image data;

means for extracting a feature from the data of one character which is extracted by said extraction means;

character recognition dictionary means for storing the feature as a standard pattern;

means for rotating the standard pattern stored in said character recognition dictionary means to produce a plurality of differently angled standard patterns different in direction from one another;

means for calculating a plurality of similarity measures between the extracted feature and the plurality of standard patterns different in direction from one another;

means for detecting a direction of the digital image data on the basis of the plurality of similarity measures wherein the similarity of measures in the comparing of angles of rotation between the extracted feature and the standard patterns; and correcting the direction of the digital image data by rotating the angle of the input image data so as to correct the input image data to a proper direction based on the detected direction thereof.

6. A document image filing system according to claim 5, further comprising:

correction means for correcting the digital image data to data having a proper direction, on the basis of the detection result by said detection means.

7. A document image filing system according to claim 6, wherein said correction means is constructed by the same feature rotation means as that of said means used to produce a plurality of features as standard patterns.

8. A document image filing system according to claim 6, wherein said correction means and said means used to produce a plurality of features as standard patterns are constructed by a program for rotation processing executed by said CPU.

9. A document image filing system according to claim 5, further comprising:

means for indicating regeneration of the digital image data on the basis of the detection result by said detection means.

10. A method of detecting a direction of digital document image data inputted by scanning a document by an optical scanner, used in a document image filing system including at least a central processing unit (CPU), a character recognition dictionary and said scanner, said method comprising the steps of:

extracting data of one character from the input digital document image data;

extracting feature data from the extracted one character;

reading out a standard pattern, which comprises feature data corresponding to the extracted feature data of the extracted character from the input digital document image data, from said character recognition dictionary which stores a plurality of feature data corresponding to a plurality of characters;

generating four direction standard patterns which are obtained by rotating the read out standard pattern at intervals of substantially 90 degrees;

calculating degrees of similarity between the feature data of the one character of the input digital document image data and the respective four standard patterns;

executing from said step of extracting data to said step of calculating for respective characters of input data for a predetermined number of times;

detecting a direction of the input digital document image data on the basis of the degree of similarity which is calculated by accumulating each one of the different directions; and correcting the direction of image data by rotating the input digital document image data so as to correct the input image data to a proper direction based on the detected direction thereof.

11. A document image filing system comprising:

a document inputting unit to which is inputted digital document image data obtained in unrestricted directions by optically scanning a document having a directional nature;

a processing unit which (i) extracts data of one character from the input digital document image data which is transferred from said document inputting unit, (ii) extracts a feature data from the extracted one character, (iii) reads out a standard pattern which comprises feature data corresponding to the extracted feature data of the extracted character, from a character recognition dictionary which stores a plurality of feature data corresponding to respective characters, (iv) generates four direction standard patterns at an interval of substantially 90 degrees, (v) calculates degrees of similarity between the feature data of one character of the input digital document image data and the respective four standard patterns, (vi) executes said steps from said extracting data processing to said calculating processing for respective characters of the input digital document image data for a predetermined number of times, (vii) detects a direction of the input digital document image data on the basis of the degrees of similarity which are calculated by accumulating the degrees of similarity for each one of the directions of the standard patterns, and (viii) corrects the direction of digital document image data by rotating the input image data so as to correct the input digital document image data to a proper direction based on the detected direction an image memory which stores said digital document image data being transferred from said document inputting unit and said digital document image data being corrected in the state of proper direction by said processing unit; and a display unit which displays said digital document image data being corrected in the state of proper direction read out from said image memory.

12. A document image filing system according to claim 11, wherein said processing unit is provided with said character recognition dictionary which stores said reference image data of a character having at least two directions.

13. A document image filing system according to claim 11, which further includes a printer which prints out said digital document image data being corrected to the state of proper direction read out from said image memory.

14. A document image filing system according to claim 11, wherein said processing unit is provided with a comparing unit which compares gray-scale image data of a predetermined character extracted from said digital document image data with reference gray-scale image data of the character.

* * * * *